(12) United States Patent
Hoffjann et al.

(10) Patent No.: US 8,372,554 B2
(45) Date of Patent: Feb. 12, 2013

(54) HYDRIDE FUEL-CELL COOLER AND CONDENSATE COOLER FOR AIRCRAFT

(75) Inventors: Claus Hoffjann, Hamburg (DE); Hansgeorg Schuldzig, Jork (DE)

(73) Assignee: Airbus Deutschland, Hamburg (DE)

( * ) Notice: Subject to any disclaimer, the term of this patent is extended or adjusted under 35 U.S.C. 154(b) by 1417 days.

(21) Appl. No.: 11/829,172

(22) Filed: Jul. 27, 2007

(65) Prior Publication Data

US 2010/0028741 A1     Feb. 4, 2010

Related U.S. Application Data

(60) Provisional application No. 60/820,487, filed on Jul. 27, 2006.

(30) Foreign Application Priority Data

Jul. 27, 2006     (DE) .................... 10 2006 034 816

(51) Int. Cl.
  *H01M 8/04*     (2006.01)
  *H01M 8/00*     (2006.01)
(52) U.S. Cl. .................. 429/439; 429/400; 429/456
(58) Field of Classification Search .............. 429/515, 429/437, 432, 434, 439–440, 443–444, 452, 429/416, 421, 513, 400, 456; 165/4, 58, 165/67, 80.1–80.3, 96, 103, 108, 157, 159, 165/164, 104.12; 180/65.31, 68.1–68.2, 180/68.4; 204/241
See application file for complete search history.

(56) References Cited

U.S. PATENT DOCUMENTS

| | | | | |
|---|---|---|---|---|
| 5,678,410 | A | * | 10/1997 | Fujita et al. ................... 62/7 |
| 6,468,681 | B1 | * | 10/2002 | Horiguchi ................. 429/437 |
| 2002/0029820 | A1 | * | 3/2002 | Ovshinsky et al. ........... 141/110 |
| 2003/0134167 | A1 | * | 7/2003 | Hirakata ................... 429/22 |
| 2004/0131902 | A1 | * | 7/2004 | Frank et al. ................. 429/21 |
| 2006/0051638 | A1 | | 3/2006 | Gross |

FOREIGN PATENT DOCUMENTS

| | | |
|---|---|---|
| DE | 10309978 A1 | 9/2004 |
| DE | 10346852 A1 | 5/2005 |
| DE | 102004059776 A1 | 4/2006 |

* cited by examiner

*Primary Examiner* — Raymond Alejandro
*Assistant Examiner* — Claire L Roe
(74) *Attorney, Agent, or Firm* — Christopher Paradies; Fowler White Boggs P.A.

(57) ABSTRACT

A cooling system for cooling a fuel-cell system on board an aircraft, in one example, includes a hydrogen accumulator, a connecting device coupling the hydrogen accumulator, with an external cooling system for dissipating heat arising upon charging of the hydrogen accumulator. The hydrogen accumulator cools down upon removal of hydrogen, because of which cooling of a condenser occurs. The cooling system need not utilize a secondary cooling loop for condenser cooling.

11 Claims, 2 Drawing Sheets

HYDRIDE FUEL-CELL COOLER AND CONDENSATE COOLER FOR AIRCRAFT

REFERENCE TO RELATED APPLICATIONS

This application claims the benefit of the filing date of U.S. Provisional Patent Application No. 60/820,487 filed Jul. 27, 2006 and of German Patent Application No. 10 2006 034 816.8 filed Jul. 27, 2006, the disclosures of which are hereby incorporated herein by reference.

FIELD OF THE INVENTION

The field relates to the cooling of fuel cells and condensates in aircraft. In particular, the field relates to a cooling system for cooling a fuel-cell system on board an aircraft, an aircraft comprising a corresponding cooling system, the use of such a cooling system in an aircraft, and a method for cooling a fuel-cell system on board an aircraft.

BACKGROUND

On board aircraft, fuel-cell configurations may be used for obtaining water from the fuel-cell exhaust air. For this purpose, it is necessary to condense out the water contained in the exhaust air flow using a condenser.

A cooling loop may be provided for condensing water vapor, to which two heat exchangers are coupled. These are a primary heat exchanger (PWT) and a secondary heat exchanger (SWT).

The condensation may be performed by indirect cooling using coolant, which is finally cooled by external air. This indirect cooling may be necessary to avoid icing of the primary heat exchanger by direct contact with external air, where the temperature may be significantly below the freezing point of water. However, this construction is complex and connected with a high overall system mass.

SUMMARY OF THE INVENTION

There may be a need to provide an improved cooling system which is constructed lighter and more simply.

According to one embodiment of the cooling system, a cooling system for cooling a fuel-cell system on board an aircraft comprises a hydrogen accumulator, where the hydrogen accumulator is capable of cooling the fuel-cell system upon discharge of the hydrogen accumulator.

Therefore, a cooling system may accelerate the condensation of water out of the cathode exhaust air by cooling the fuel-cell system, without two heat exchangers being necessary for this purpose. In particular, cooling by external air is not necessary. Rather, sufficient cooling of the fuel-cell system is provided by the hydrogen accumulator alone, which may additionally be used as a cooler in normal operation, for example.

According to a further embodiment of the cooling system, the cooling system also comprises a connection device for connection to an external cooling system, the external cooling system being implemented to dissipate heat which arises upon charging the hydrogen accumulator with hydrogen, and the external cooling system exclusively being used during charging of the hydrogen accumulator and remaining on the ground during a flight of the aircraft.

In one example, the heat arising upon charging of the hydrogen accumulator may thus be dissipated by a high-performance external cooling system, which is connected for this purpose to the connection device and thus to a heat exchanger of the hydrogen accumulator, when the aircraft is located on the ground. To reduce the takeoff weight, this external cooling system may be disconnected from the aircraft before takeoff. During the flight, the fuel-cell cooling may be performed by the hydrogen accumulator.

According to a further embodiment of the cooling system, the hydrogen accumulator is integrated in the fuel-cell system.

In this way, an entire module may be provided, which is mountable as a coherent block in the aircraft. The thermal contact between fuel-cell block and hydrogen accumulator and/or between a condenser/condensate precipitator and the hydrogen accumulator may be improved by the integration of the hydrogen accumulator in the fuel-cell system. Heat losses or cold losses may thus be minimized.

According to a further embodiment of the cooling system, the hydrogen accumulator is implemented as a metal hydride accumulator.

In this example, secure hydrogen storage may be ensured at high storage density and high cooling performance.

According to a further embodiment of the cooling system, the fuel-cell system has a cell stack and the hydrogen accumulator being implemented for cooling the cell stack and cathode exhaust air of the fuel-cell system.

According to a further embodiment of the cooling system, the hydrogen accumulator is implemented for cooling cabin air which is fed to the fuel-cell system.

The fuel-cell system is therefore not supplied with external air, but rather with on-board cabin air. The cabin air may be cooled by the hydrogen accumulator before it is fed to the fuel-cell system to increase the efficiency of the fuel cells.

According to a further embodiment of the cooling system, the cooling system is implemented and controllable in such a way that the heat arising upon charging of the hydrogen accumulator with hydrogen is usable for preheating the fuel-cell system to operating temperature.

In this example, the thermal energy released upon charging may be used, for example, by temporary storage or by direct dissipation to the fuel-cell system (for example, via direct thermal contact to the hydrogen accumulator), so that the fuel-cell system reaches its operating temperature. In this example, additional heat energy which must otherwise be applied by a further heating system may be saved. Furthermore, the external cooling system may be relieved in this way.

According to a further embodiment of the cooling system, the cooling system also comprises an electronic regulating unit for regulating the cooling system on the basis of temperature data and a temperature measuring unit on the fuel-cell system for outputting the temperature data, where the electronic regulating unit is coupled to the temperature measuring unit.

Temperature data of the fuel-cell system is thus detected and transmitted to the electronic regulating unit, so that the cooling system may be set accordingly.

According to a further embodiment of the cooling system, the electronic regulating unit is implemented for regulating the extraction of hydrogen from the hydrogen accumulator as a function of the temperature of the fuel-cell system.

If the temperature of the fuel-cell system is too low, the hydrogen extraction rate may be throttled accordingly, so that the cooling is reduced and the temperature of the fuel cells rises again. Additional hydrogen required by the fuel system may be taken from a hydrogen intermediate accumulator.

According to a further embodiment of the cooling system, the cooling system also comprises a hydrogen storage tank or intermediate accumulator for feeding hydrogen to the fuel-cell system.

This hydrogen storage tank may also be adapted for feeding hydrogen to the hydrogen accumulator.

According to a further embodiment of the cooling system, the cooling system also comprises a hydrogen generator for liberating hydrogen from a hydrocarbon compound and feeding hydrogen to the fuel-cell system.

Therefore, additional hydrogen may be generated on board the aircraft to be fed to the fuel-cell system, the hydrogen storage tank, or the hydrogen accumulator.

According to a further embodiment of the cooling system, the fuel-cell system has fuel cells of the PEMFC (Proton Exchange Membrane Fuel Cell) type.

According to a further embodiment of the cooling system, an aircraft which has a cooling system as described above is specified.

According to a further embodiment of the cooling system, the use of such a cooling system in an aircraft is specified.

Furthermore, a method for cooling a fuel-cell system on board an aircraft is specified, in which a hydrogen accumulator is charged with hydrogen from a hydrogen storage tank and the fuel-cell system is cooled upon discharge of the hydrogen accumulator.

In this example, a method which avoids the use of two cooling loops during flight is provided. Extra cooling is not necessary. Rather, the fuel-cell system cooling is solely provided by the hydrogen accumulator already present in the system.

In the following, preferred embodiments of the cooling system are described with reference to the figures.

BRIEF DESCRIPTION OF THE FIGURES

The illustrations in the figures are schematic and are not to scale. In the following description of the figures, identical reference numerals are used for identical or similar elements.

DETAILED DESCRIPTION

The examples described and drawings rendered are illustrative and are not to be read as limiting the scope of the invention as it is defined by the appended claims.

Figure 1:
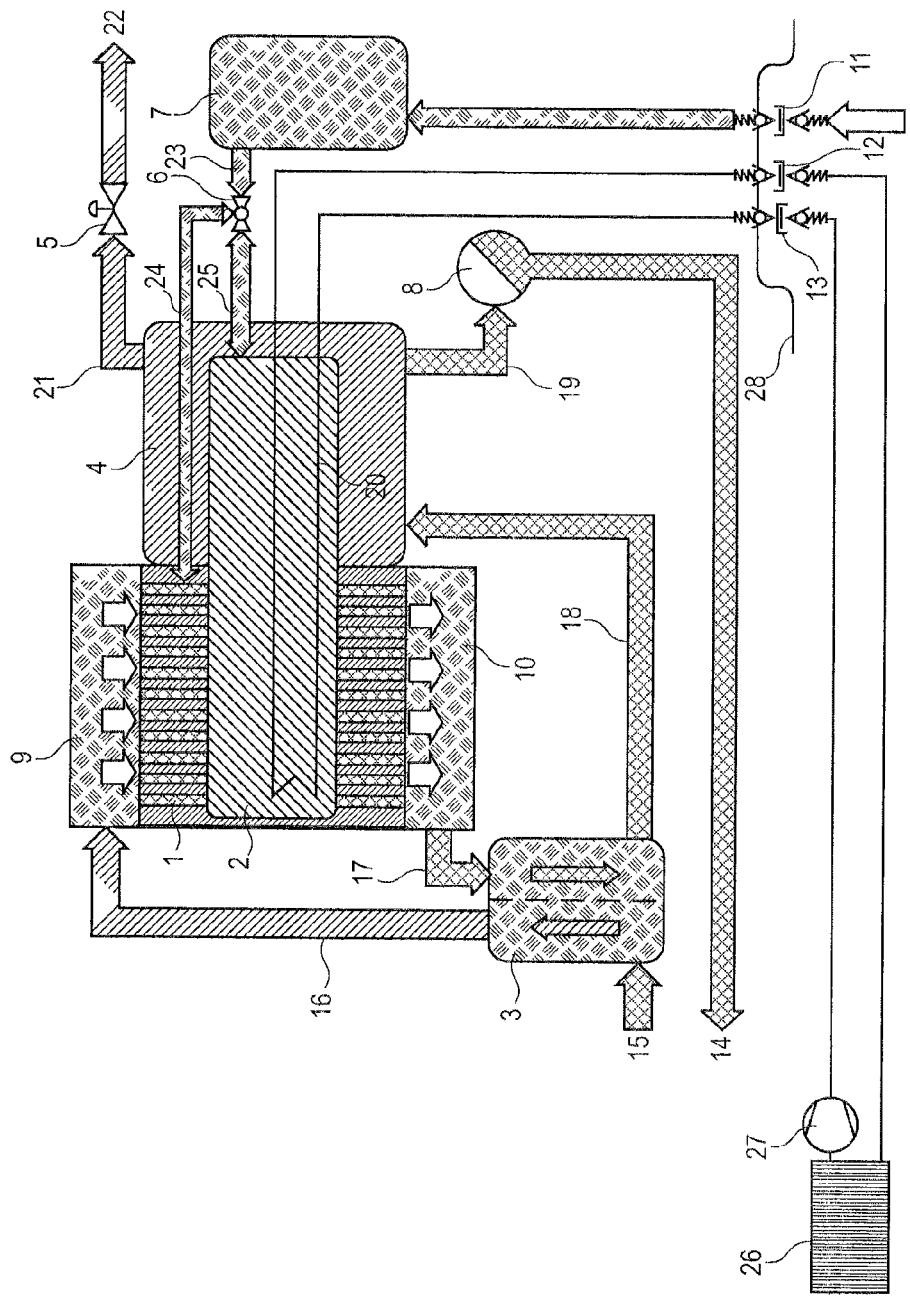
FIG. 1 shows a schematic illustration of a cooling system according to an embodiment of the cooling system, which is integrated in a fuel-cell system of an aircraft.

In FIG. 1 showing a schematic illustration of a cooling system which is integrated in a fuel-cell system of an aircraft, the cooling system comprises a hydride accumulator 2, an internal heat exchanger 20, and a connection panel 28 having corresponding quick-acting couplings 11, 12, 13.

In aircraft especially, the mass and space required as well as the safety requirements are critical factors for the cost-effectiveness of an installed system. Method steps are separated by the cooling system according to one example in such a way that the primary cooling of a fuel cell 1 and a water condenser 4 may occur inside the aircraft in flight. In this example, the secondary cooling of the system is exclusively performed during the shutdown time on the ground.

Hydrogen accumulators, such as special metal hydride accumulators, have the property that they release thermal energy upon charging with hydrogen and absorb thermal energy upon the removal of hydrogen. The relevant temperature ranges are directly dependent on the type of the hydride and may be tailored to the particular application.

In one example, a hydrogen accumulator 2, for example, in the form of a hydride accumulator 2, is first charged with hydrogen. According to the embodiment of the cooling system shown in FIG. 1, this charging is performed via the hydrogen storage tank 7 and the changeover valve 6 as well as the feed line 23 and the charging and discharging line 25. The storage tank 7 is in turn refilled with hydrogen from an external supply apparatus (not shown in FIG. 1) via the connection panel 28 and the quick-acting coupling 11.

Because the hydride accumulator 2 heats up during this charging procedure, it is cooled via the internal heat exchanger 20 and the external cooling system 26, 27. The external cooling system 26, 27 is only connected via the connection panel 28 and the quick-acting couplings 12, 13 to the hydride accumulator 2 for this purpose during the time of charging, to thus (at least partially) dissipate the charging heat to the external air.

Because this external cooling system 26, 27 remains on the ground and therefore the weight and size of the external cooling system only play a minor role, an especially large and effective cooler 26 and a high-performance coolant pump 27 may be used here.

After the system is completely charged with hydrogen (i.e., both the hydride accumulator 2 and the storage tank 7 are charged), the external cooling system 26, 27 and the hydrogen supply at the connection panel 28 are disconnected at the quick-acting couplings 11, 12, and 13.

By changing over the changeover valve 6 from the charging and discharging line 25 to the anode feed 24, the fuel cell 1 may be put into operation upon reaching a defined altitude.

A differential pressure between cabin air intake 15 and external on-board ventilation 22, which allows an air flow through the fuel-cell, may be required for this purpose, in one example.

Firstly, the cabin air 15 is humidified in a cathode air humidifier 3 and then supplied to the cathode of the fuel-cell via the feed 16 and via the distributor 9. A part of the cathode air is conducted past the integrated hydride accumulator 2 in such a way that it may cool the fuel-cell as it is conducted further through the cell.

Cathode exhaust air and cold air are then combined in the cathode exhaust air collector 10 and fed to the condenser/condensate precipitator 4. This occurs via line 18. The cathode exhaust air may be fed with the cold air to the humidifier 3 (see line 17) between the cathode exhaust air collector 10 and the condenser/condensate precipitator 4 to humidify the cabin air 15.

The water contained in the cathode exhaust air flow condenses out in the condenser/condensate precipitator 4 due to the cooling effect of the hydride accumulator 2. The condensate is fed via condensate line 19 to the condensate diverter 8. The condensate diverter 8 provides the condensate to the water system of the aircraft for further use by passengers or personnel via line 14.

The now dried cathode exhaust air 21 is discharged via the exhaust air regulating valve 5 to the external air. This occurs via line or outlet 22.

Further hydrogen accumulators may also be provided for cooling, which may be integrated in the fuel-cell system. Furthermore, an electronic regulating unit 31 is provided for regulating the cooling system. The regulating unit 31 is connected to one or more temperature measuring units. The temperature measuring units measure the temperature at one or more locations inside the fuel-cell system. These temperatures are transmitted to the electronic regulating unit. For example, the electronic regulating unit may control or regulate the hydrogen removal rate from the hydride accumulator 2, depending on the desired cooling rate. The hydrogen removal rate is regulated via the control of the valve 6, for example.

One advantage of this configuration is that components which have a high system weight, such as the coolant pump, and generate additional air resistance, such as the cooler, no longer have to be carried along, but rather may remain on the ground.

In this way, weight is saved and the air resistance is reduced.

Figure 2:
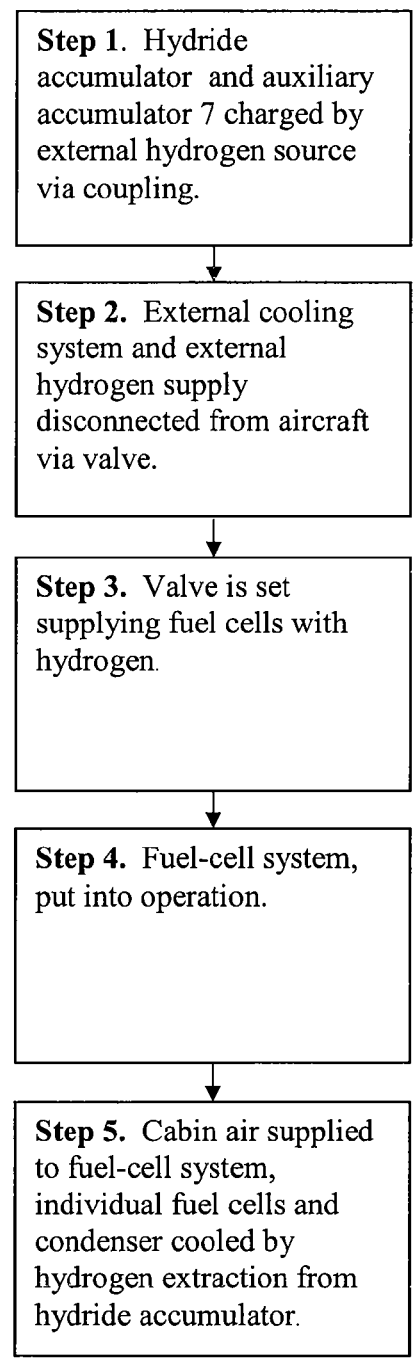
FIG. 2 shows a flowchart of a method for cooling a fuel-cell system on board an aircraft according to a further embodiment of the cooling system.

FIG. 2 shows a flowchart of a method for cooling a fuel-cell system on board an aircraft according to one example of the cooling system. In step 1, the hydride accumulator 2 and the auxiliary accumulator 7 are charged by an external hydrogen source via the quick-acting coupling 11. The fuel-cell system is preheated by the heat arising in the hydride accumulator 2 during the charging procedure. Excess heat may be dissipated via an external cooling system.

In step 2, the external cooling system 26, 27 and the external hydrogen supply via valve 11 are disconnected from the aircraft.

After reaching the cruising altitude, or possibly also already at an earlier time, the valve 6 is set in such a way that the fuel cells may be supplied with hydrogen (step 3).

In step 4, the fuel-cell system, which has already been sufficiently preheated by the charging procedure, is put into operation.

The cabin air supplied to the fuel-cell system, the individual fuel cells, and the condenser are cooled by the ongoing hydrogen extraction from the hydride accumulator 2 in step 5.

Moreover, it is to be noted that "comprising" does not exclude any other elements or steps and "a" or "one" does not exclude multiples. Furthermore, it is to be noted that features or steps which have been described with reference to one of the above embodiments may also be used in combination with other features or steps of other embodiments described above. Reference numerals in the claims are not to be viewed as a restriction.

Alternative combinations and variations of the examples provided will become apparent based on this disclosure. It is not possible to provide specific examples for all of the many possible combinations and variations of the embodiments described, but such combinations and variations may be claims that eventually issue.

LIST OF REFERENCE NUMERALS 1 fuel cell
2 hydride accumulator
3 cathode air humidifier
4 condenser and precipitator
5 exhaust air regulating valve
6 changeover valve
7 hydrogen storage tank
8 condensate diverter
9 cathode intake air/cold air distributor
10 cathode exhaust air/cold air collector
11 quick-acting coupling—hydrogen
12 quick-acting coupling—cooling RL
13 quick-acting coupling—cooling VL
14 feed to the freshwater system
15 cabin air intake
16 cathode intake air
17 cathode exhaust air
18 condenser intake air
19 condensate
20 internal heat exchanger
21 exhaust air
22 external on board ventilation
23 hydrogen feed
24 anode feed of hydrogen
25 charging and discharging of hydrogen
26 external cooler
27 external coolant pump
28 connection panel

What is claimed is:

1. A cooling system for cooling a fuel-cell system on board an aircraft, the fuel cell system comprising:
   a fuel cell; and
   a water condenser;
   wherein the cooling system comprises:
      a hydride accumulator integrated in the fuel cell; and
      a connection device coupling an external cooling system with the hydride accumulator and a coupler coupling the hydride accumulator to an external source hydrogen for charging the hydride accumulator with hydrogen;
      wherein the hydride accumulator is arranged such that the fuel-cell is cooled only during discharge of hydrogen from the hydride accumulator, without any external cooling of the fuel cell by the external cooling system, and the external cooling system dissipates heat which arises during charging of the hydride accumulator with hydrogen, when the external cooling system is coupled by the connection device with the hydride accumulator exclusively during charging and the external cooling system remains on the ground during flight of the aircraft.

2. The system of claim 1, wherein the hydride accumulator includes an internal heat exchanger integrated in the hydride accumulator.

3. The system of claim 1, wherein the hydride accumulator includes a metal hydride accumulator.

4. The system of claim 1, wherein the fuel-cell system has a cell stack; the hydride accumulator is capable of cooling the cell stack and cathode exhaust air of the fuel-cell system.

5. The system of claim 1, wherein the cooling system is capable of being controlled in such a way that heat arising upon charging of the hydride accumulator with hydrogen is usable for preheating the fuel-cell system to operating temperature.

6. The system of claim 1, further comprising:
   an electronic regulating unit for regulating the cooling system on the basis of temperature data;
   a temperature measuring unit on the fuel-cell system for outputting the temperature data;
   wherein the electronic regulating unit is coupled to the temperature measuring unit.

7. The system of claim 6, wherein the electronic regulating unit is implemented to regulate extraction of hydrogen from the hydride accumulator as a function of the temperature of the fuel-cell system.

8. The system of claim 1, further comprising:
   a hydrogen storage tank for feeding hydrogen to the fuel-cell system.

9. The system of claim 1, further comprising:
   a hydrogen generator for liberating hydrogen from a hydrocarbon compound and feeding hydrogen to the fuel-cell system.

10. The system of claim 1, wherein the fuel-cell system includes proton exchange membrane fuel cells.

11. An aircraft, comprising a fuel cell system of claim 1.

* * * * *